United States Patent [19]
Farrell et al.

[11] 3,847,529
[45] Nov. 12, 1974

[54] APPARATUS FOR CLAMPING MOLD OF INJECTION MOLDING MACHINE

[75] Inventors: John J. Farrell, Green Brook; William Grazine, Piscataway, both of N.J.

[73] Assignee: Farrell Patent Company, Dunellen, N.J.

[22] Filed: Dec. 7, 1972

[21] Appl. No.: 312,829

[52] U.S. Cl.................425/451.2, 425/DIG. 222, 425/DIG. 223, 425/451.5

[51] Int. Cl............................................. B29f 1/00

[58] Field of Search.......................... 425/450–457, 425/DIG. 222, DIG. 205, 405 H, 77, 324, 425/326 B, 327

[56] References Cited
UNITED STATES PATENTS

| | | | |
|---|---|---|---|
| 3,335,463 | 8/1967 | Allard et al................ | 425/DIG. 222 |
| 3,504,403 | 4/1970 | Brown et al. ..................... | 425/450 |
| 3,712,774 | 1/1973 | Parker ....................... | 425/DIG. 222 |

*Primary Examiner*—Milton S. Mehr
*Attorney, Agent, or Firm*—Sandoe, Hopgood & Calimafde

[57] ABSTRACT

This molding machine has a mechanical linkage that opens and closes the mold without applying pressure to hold the mold closed. Hydraulic cylinders with short strokes apply pressure after the mold is closed and the mechanical linkage is no longer in motion. Mechanical wear is thereby eliminated. For multi-mold machines, the linkage for the different molds are mechanically connected and operated simultaneously from a common power source. Where the movable mold parts are heavy, an auxiliary power cylinder connected with the movable mold part in line with its center of gravity can be used to open the mold with less effort required from the linkage.

23 Claims, 4 Drawing Figures

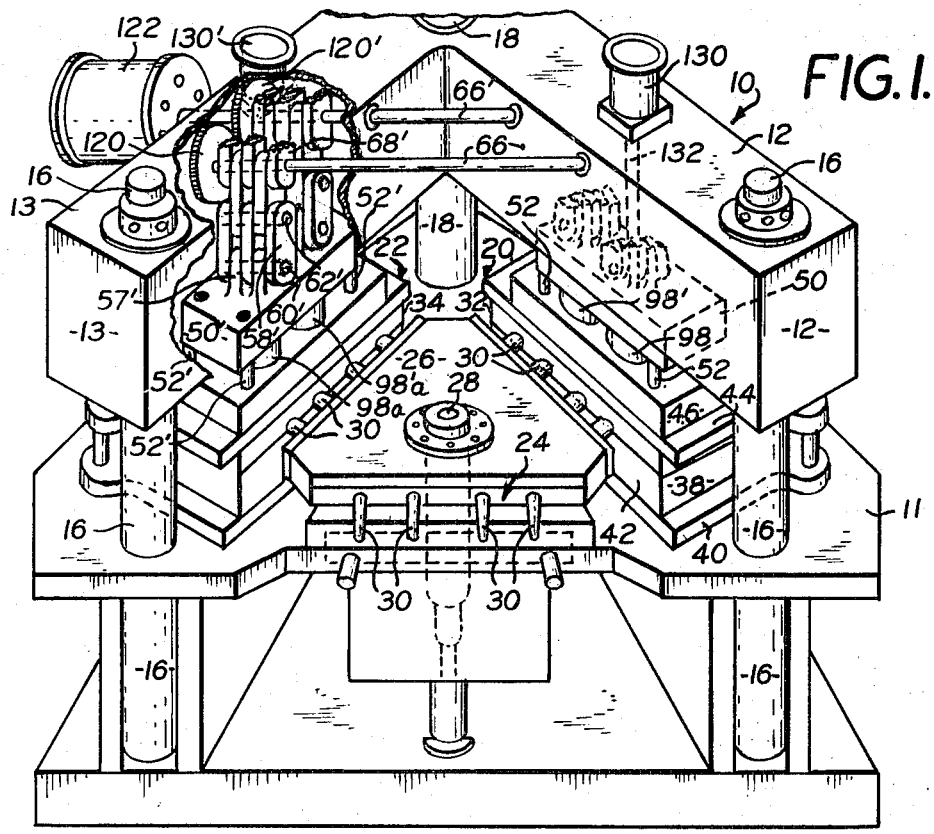
FIG. 1.
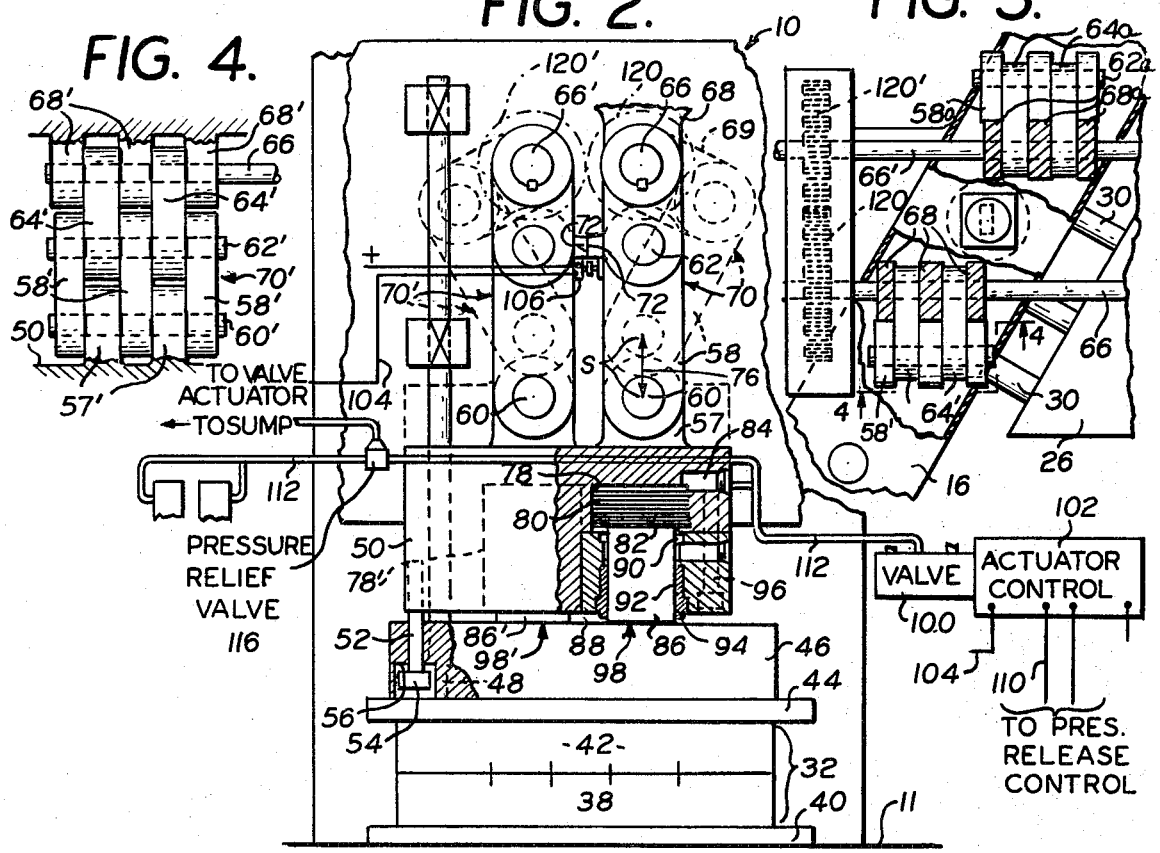

APPARATUS FOR CLAMPING MOLD OF INJECTION MOLDING MACHINE

BACKGROUND AND SUMMARY OF THE INVENTION

The molding machine of this invention has the usual mold parts, one of which is movable toward and from the other to close and open the mold; and the movable part is moved between open and substantially closed position by a mechanical linkage, preferably a toggle. The expression "substantially closed" is used herein to designate a condition where the mold parts are in contact with one another but not yet subject to the pressure which will hold them closed during a molding operation; or are just short of being in contact by a fraction of an inch.

After the mechanical linkage has moved the mold parts to a closed position, the pressure for holding the mold closed is applied by pressure means that preferably comprise hydraulic cylinders. In order to distribute the pressure load more evenly on the movable mold part, a plurality of hydraulic cylinders can be used at spaced locations over the movable mold part.

One of the principal advantages of the invention is that the linkage is never subject to any substantial pressure when moving. This means that the linkage always operates under light load and the bearings of the linkage last indefinitely. Another advantage is that the means for applying the pressure to the mold travels through an extremely small stroke so that there is less oil capacity and off power required for applying pressure to the mold.

By using a linkage to bring the movable mold part into substantially closed position and then applying the pressure after the linkage has stopped moving, the system provides soft closing of the mold. On a multi-mold machine, such as an injection molding machine having successive mold stations, all of the molds can be open and closed simultaneously by tying the linkages for the different molds to a common power source, preferably by shafts which operate toggles for the different molds.

In the preferred construction there are a plurality of toggles for operating each movable mold part. Pairs of toggles with each toggle of the pair folding in opposite directions can be located so that their mid portions come against stops when the toggles have moved just beyond dead center position. Such a toggle combination raises and lowers the movable mold part without applying oblique loading to the guide pins of the mold and the stops prevent the toggles from folding or transmitting folding loads back to the linkage operating mechanism.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view of an injection molding machine made in accordance with this invention;

FIG. 2 is a greatly enlarged view, partly in section, showing one pair of toggles of the machine shown in FIG. 1, and showing the pressure cylinders for holding the mold closed when in operation;

FIG. 3 is a diagrammatic top plan view of the left side of the injection molding machine shown in FIG. 1; and FIG. 4 is a view taken on the line 4—4 of FIG. 3 and showing one of the toggles.

DESCRIPTION OF PREFERRED EMBODIMENT

FIG. 1 shows a blow molding injection molding machine including a fixed frame 10 which has a base 11 and angularly related portions including a right hand portion 12 and a left hand portion 13 supported from the base 11 by forward posts 16 and a rearward post 18. There is an injection mold station located between the base 11 and the upper right hand portion 12. This injection mold station is designated generally by the reference character 20. There is a blow mold station 22 located between the base 11 and the upper left hand portion 13. At the front of the machine, there is a stripping station, designated generally by the reference character 24.

A turret 26 is located in the space between the different stations and this turret is of triangular shape and symmetrical about its center support 28. Parison pins 30 extend from each of the wide faces of the turret 26. In the drawing, four of the parison pins are located in a mold 32 at the injection molding station 20 and the mold 32 is shown closed. The four parison pins on another face of the turret 26 are located in a mold 34 located at the blowing mold station 22. The parison pins 30 which project from the third wide face of the turret 26 are located at the stripping station. The mechanism for stripping molded articles from the parison pins of the stripping station is not shown since it forms no part of the present invention.

It is sufficient to understand that the molds 32 and 34 open and close with each cycle of operation. As each of these molds opens, the turret 26 is raised by a cylinder located below the center 28 and when the parison pins 30 and the material carried by these pins, is clear of the lower section of the mold, the turret 26 rotates through 120° to shift the parison pins to the next station of the molding machine. This is in accordance with conventional operation of turret molding machines and no further description of this operation is necessary for a complete understanding of this invention.

The mold 32 is of conventional construction and includes a fixed mold part 38 secured to a lower platen 40 which is fixed to the base 11. An upper mold section 42 is movable toward and from the fixed mold section 38, there being guide pins extending upward from the fixed mold section 38 through bearings in the movable mold section 42 for insuring register of the cavity parts in the respective mold sections, all in accordance with conventional mold practice.

There is an upper platen 44 secured to the upper mold section 42 and forming a unit therewith. An auxiliary or secondary platen 46 is located above the platen 44 and is connected to it by screws 48, one of which is shown in FIG. 2. It will be understood that there are similar screws 48 at other locations connecting the auxiliary or secondary platen 46 with the platen 44 in a unitary construction.

Above the auxiliary platen 46 there is a cylinder block 50 which is connected to the auxiliary platen 46 by screws 52; there being a screw 52 close to each corner of the cylinder block 50 and to each corner of the auxiliary platen 46.

Referring to FIG. 2, each of the screws 52 has a head 54 located in a recess or socket 56 in the bottom face of th auxiliary platen 46. The height of the screw head 54 is somewhat less than the height of the socket 56. FIG. 2 shows the screw head 54 spaced from the top surface of the platen 44 and spaced from the top wall of the socket 56; this being its position when the mold is closed.

When the cylinder block 50 moves upward, from the position shown in FIG. 2, the screw 52 can move for a short distance before the screw head 54 contacts with the top wall of the socket 56. Thus the screw 52 provides a lost motion connection between the platen 46 and the cylinder block 50. As the cylinder block 50 moves upward, the auxiliary platen 46 does not move upward until this lost motion is taken up in an upward direction. As soon as the lost motion is taken up, then the platen 46 and the movable mold section 42 also move upward as a unit with the cylinder block 50 to open the mold.

There is a lug 57 connected to and extending upward from the cylinder block 50. This lug 57 is pivotally connected with a lower toggle link 58 by a pivot shaft 60. The lower toggle link 58 is connected by a pivot shaft 62 with an upper toggle link 64 which has a pivot shaft 66 that extends through bearings in a lug 68 which is an integral part of the fixed frame above the molding station. The toggle formed by the links 58 and 64 is designated generally by the reference character 70.

In the construction shown in FIG. 2 there is a toggle 70' which is in all respects similar to the toggle 70 except that it folds in the opposite direction. The toggles 70 and 70' are shown in full lines in FIG. 2 with their links substantially in alignment. Preferably, the toggles 70 and 70', when at their limits of movement, as shown in FIG. 2, are slightly beyond dead center in a direction of movement toward one another so that the mid points of the toggles 70 and 70' are in contact with stops 72. Each stop may be a lug on the other toggle or the stops may be a fixed element extending from a part of the frame of the machine. FIG. 2 shows the toggles in contact with one another. The advantage of having the toggles 70 and 70' come against stops which are slightly beyond dead center, and against stops which prevent further movement of the toggles, is that upward force on the toggles has no compartment tending to fold the toggles by moving them in directions away from one another. Thus the actuating mechanism which brings the toggles into their straightened position is not subject to any force when the toggles are subjected to upward pressure from the mold, as will be explained.

In the preferred embodiment of the invention, multilink toggles are used as shown in FIG. 4. This view shows the toggle 70', but it will be understood that all of the toggles are of similar construction. There are two lugs 56' extending upward from the cylinder block 50. The pivot shaft 60 extends through both of these lugs 56' and through three lower links 58', one of which is located between the lugs 56' and the other two which are located beyond the lugs 56'.

The upper ends of these lower links 58' are connected by the pivot shaft 62 with two upper links 64' which are keyed to the shaft 66; and the shaft 66 rotates in bearings in three lugs 68' extending downward from the main frame. Thus the toggle 70' has three lower links and two upper links; and the upper links may be somewhat heavier than the lower links if desired to provide strength for the upper links equal to that of the lower links. In the illustrated construction, however, two upper links 64' can be used with three lower links 58', even though the links are not of any greater cross section, because of the fact that the upper links 64' are much shorter than the lower links 58' and therefore not subject to the same bending moments.

Referring again to FIG. 2, the toggles 70 and 70' are shown in their folded positions in broken lines. The folding of these toggles raises the pivot shafts 60 and 60' by a distance S as indicated by the dimension arrow 76. This upward movement of the pivot shafts 60 and 60' causes the cylinder block 50 to be raised by an equal amount and causes the auxiliary platen 46 to be raised by the same amount less the lost motion between the screw head 54 and the top wall of the socket 56. The top mold section 42 and upper platen 44 move upward as a unit with the auxiliary platen 46.

When the mold is to be closed, the shafts 66 and 66' are rotated in opposite directions; and this causes the toggles 70 and 70' to move from their broken line positions to the full line positions where the links are in substantial alignment with one another and preferably slightly beyond dead center, as previously explained. This straightening of the toggles 70 and 70' moves the pivot shafts 60 and 60' downward and lowers the cylinder block 50 until the mold section 42 comes in contact with the lower mold section. The cylinder block 50 continues to move somewhat lower so that the lost motion between the screw head 54 and the top of the socket 56 is again established. The screw 52 is adjusted with respect to the cylinder block 50 into which the screw threads so that when the cylinder block 50 is at the lower limit of its stroke, the head 54 of the screw 52 does not quite touch the upper platen 44. If it did, then the toggles would exert a downward pressure on the mold section, and it is a feature of this invention that the toggles serve the purpose of bringing the mold section 42 to a substantially closed position without exerting pressure on the mold section 42 against the complementary lower mold section.

Within the cylinder block 50 there are cylinders, one of which is shown in section in FIG. 2. This cylinder designated by the reference character 78 contains a piston 80 with appropriate piston rings 82. Hydraulic fluid is supplied to the cylinder 78 through a large inlet port 84; the size of the port 84 being sufficient to prevent throttling of the fluid flow. A piston rod 86, which is actually an extension of the piston 80, extends through a lower wall 88 of the cylinder 78 and somewhat beyond the lower end of the cylinder block 50.

There is packing 90 and 92 around the piston extension 86, and this packing 92 is compressed by a packing gland 94 threaded into a counterbore in the lower end of the cylinder wall 88. Although the cylinder wall 88 forms a part of the cylinder block 50, it is preferably made as a separate piece and connected to the remainder of the block 50 by screws 96 located at appropriate positions on the cylinder wall 88. The piston 80 operating in the cylinder 78 and moving the piston extension 86 comprises a fluid-operated motor, designated generally by the reference character 98, for exerting a downward hydraulic pressure on the auxiliary platen 46 after the cylinder block 50 has been brought to the limit of its downward movement by the toggles 70 and 70'.

There are other cylinders in the cylinder block 50 and one such other cylinder, 78', is indicated in broken lines in FIG. 2. When hydraulic fluid under pressure is supplied to the cylinders 78 and 78' and to any other cylinders in the cylinder block 50, the piston extension 86 and 86' is forced downward against the auxiliary platen 46 and this force is transmitted through the auxiliary platen to the upper platen 44 and to the mold section 42 to hold the mold closed with sufficient pressure to resist the internal pressure to which the cavities in the mold are subjected. Since the toggles 70 and 70' bring the mold section 42 into substantially closed position, the piston extensions 86 and 86' of the fluidoperated motors of the cylinder block 50 do not have to have any substantial travel. They are pressure-applying devices for acting on the mold after the mold is substantially closed. The stroke of the pistons and piston extensions 86 and 86' are less than the lost motion of the screw head 54 in the socket 56.

Hydraulic fluid is supplied to the cylinders 78 and 78' and to any other cylinders that are to operate simultaneously with these cylinders 78 and 78' to apply pressure to the auxiliary platen 46. This hydraulic fluid is supplied from a common valve 100 operated by an actuator 102 which is supplied with energy through a circuit 104 which leads to a switch 106 that is actuated when the toggles 70 and 70' reach their limit of travel. Thus no pressure is applied by the pistons in the cylinder 78 and 78' until after the toggles 70 and 70' have reached their limit of movement. The strong upward thrust of the cylinder block 50 reacting to the downward pressure of the fluid-operated motors against the auxiliary platen 46 is thus timed so that it occurs after the toggles 70 and 70' are in their final position and there is no movement of any of the toggle bearings during the period that the system is under hydraulic pressure.

Before the toggles 70 and 70' begin movement to open the mold, a circuit 110 is operated to move the valve 100 into position to release the pressure from the cylinders 78 and 78' before the toggle movement starts. This control for the hydraulic fluid is diagrammatic and merely representative of means for supplying pressure to the mold after the linkages which move the mold into substantially closed position have reached their limit of travel and are no longer in motion.

By using the same valve 100 to control the flow of hydraulic fluid to the cylinders 78 and 78' and such other cylinders as are located in the block 50 in position to exert downward pressure on the auxiliary platen 46 and on the mold section 42, the fluid-operated motors 98 and 98' operate simultaneously and with identical pressures. The piping 112 which connects the different cylinders with the valve 100 are kept full of liquid so that when the valve 100 moves into open position pressure is instantaneously supplied to all of the hydraulic motors 98, 98' and such other motors as are carried by the cylinder block 50. The maximum pressure that can be exerted by these hydraulic motors can also be controlled by having a common pressure relief valve 116 which limits the pressure in the piping 112 so that no cylinder can receive the hydraulic pressure at a value higher than that for which the pressure relief valve 116 is adjusted.

At the blowing mold station 22, the construction is the same as that which has been described for the injection mold station 20. In order to operate the molds at both stations simultaneously, the toggle limits for the blowing mold station 22 have their upper links keyed or otherwise secured to the same shafts 66 and 66' as are used for the toggles 70 and 70'. The toggles for the blowing mold station 22 are indicated by the same reference characters as in FIG. 2 but with a letter $a$ appended.

The shafts 66 and 66' are made to turn in unison, and in opposite directions, by connecting the shafts together through gears 120 and 120', best shown in FIG. 1. Either one of these shafts 66 or 66' can be turned by appropriate motor power. In the construction shown in FIG. 1 there is a rotating cylinder 122 connected to the shaft 66 for rotating the shaft by hydraulic power when desired. This cylinder 122 is merely representative of motor means for rotating the shaft 66' clockwise and then counterclockwise as necessary to move the toggles in the direction to open and close the molds.

In order to be able to connect the toggles on opposite sides of the molding machine to the parallel shafts 66 and 66', it is necessary that the pivot shafts of the toggles extend in directions oblique to the direction of extent of the molds at the stations 20 and 22. This is shown clearly in FIG. 1, though the illustration is diagrammatic.

With the toggle linkages illustrated in the drawing, any horizontal force components should be balanced out by the fact that the toggles fold in opposite directions. By thus balancing out horizontal components, there is only minimum friction on the guide pins 52 and 52'.

In order to open and close the molds, even if the linkages do not balance out horizontal components, and without subjecting the guide pins 52 and 52' to unnecessary wear as the result of horizontal components of the opening and closing forces, an auxiliary power means can be used in addition to the cylinder 122. Such an additional power means is shown in FIG. 1 as consisting of a motor 130, preferably a hydraulic motor, having a piston rod 132 shown diagramatically by a broken line. This piston rod 132 extends downward to the cylinder block 50 and connects with the cylinder block in alignment with the center of gravity of the cylinder block 50 and the other structure that moves as a unit with this cylinder block. Thus actuation of the motor 130 provides force for raising and lowering the movable mold part without providing any horizontal components of force which would increase the friction against the guide pins 52. A similar auxiliary motor 130 can be used for the movable mold part of the injection mold station 20.

The right hand portion 12 of the frame 10 diverges from the left hand portion 13 at an angle of approximately 120° corresponding to the angles between the successive stations 20, 22 and 24 of the molding machine. The posts 16 and 18, which support these upper portions of the frame against the force of gravity when the machine is not performing a molding operation, must be strong enough to withstand the substantially greater load imposed on them in tension when the machine is in operation and the molds are under internal pressure. The posts 16 must be strong enough to withstand the tension imposed by one mold, but the post 18 is subject to tension caused by pressure at both of the mold stations 20 and 22 simultaneously. The post 18 is, therefore, substantially larger in cross section to withstand this additional loading.

The preferred embodiment of the invention has been illustrated and described, but changes and modifications can be made and some features can be used in different combinations without departing from the invention as defined in the claims.

What is claimed is:

1. A molding machine including in combination a fixed frame, a mold including two parts, one of which is movable toward and from the other to close and open the mold, guide means along which the movable mold part travels, a linkage by which the movable mold part is connected with the fixed frame, the linkage being operable to put the movable mold part in substantially closed position when the linkage reaches its limit of movement in one direction, the linkage including two toggles that fold in opposite directions to balance side thrust of the toggles and to reduce wear of said guide means, each toggle being movable into a substantially straight position by the time the movable mold part reaches substantially closed position, and fluid-operated motor means in position to apply pressure to the mold to hold the mold closed after the linkage reaches its limit of movement whereby the final pressure for closing the mold is exerted after the linkage stops moving.

2. The molding machine described in claim 1 characterized by an auxiliary platen to which the movable part of the mold is connected by a lost motion connection whereby the movable part of the mold has limited movement with respect to said auxiliary platen, and the fluid-operated motor means being located between the auxiliary platen and the movable mold part and operable to impart the final closing movement of the movable part after the linkage reaches its limit of travel.

3. The molding machine described in claim 1 characterized by an auxiliary platen to which the movable part of the mold is connected and with respect to which the movable mold part has limited relative movement, the fluid operated motor means including a plurality of cylinder-and-piston hydraulic motors located between the auxiliary platen and the movable mold part to move the movable mold part with respect to the auxiliary platen through part of said limited movement after the linkage has moved the movable platen to the limit of travel of the linkage.

4. The molding machine described in claim 1 characterized by the toggle linkage having parts that move into a dead center position and then slightly beyond dead center position at a limit of travel of said toggle, and a stop with which the toggle contacts when it moves slightly beyond dead center, said stop preventing the toggle from folding when the pressure is applied between the mold and the toggle by the fluid-operated motor means.

5. The molding machine described in claim 1 characterized by control means responsive to the movement of the linkage to a predetermined position adjacent to the end of the travel of the linkage for actuating the motor that applies the pressure to the mold.

6. The molding machine described in claim 1 characterized by control means responsive to the completion of movement of the toggle linkage for actuating the hydraulic motor whereby the toggle linkage moves prior to the operation of the hydraulic motor and only prior to the operation of the hydraulic motor.

7. The molding machine described in claim 1 characterized by there being a plurality of hydraulic motors at spaced locations along the movable mold part for distributing the application of force that holds the mold closed under pressure.

8. A molding machine including in combination a fixed frame, a mold including two parts, one of which is movable toward and from the other to close and open the mold, a linkage by which the movable mold part is connected with the frame, the linkage being operable to put the movable mold part in substantially closed position when the linkage reaches its limit of movement in one direction, and a fluid-operated motor in position to apply pressure to the mold to hold the mold closed after the linkage reaches its limit of movement whereby the final pressure for closing the mold is exerted after the linkage stops moving, characterized by the linkage including a toggle that moves into a substantially straight position by the time the movable mold part reaches substantially closed position and before the mold parts are brought together under mold operating pressure, the fluid controlled motor being a cylinder-and-piston hydraulic motor, and further characterized by guide pins that guide the movable mold part during its movement between open and closed position, power means for operating the toggle to operate the movable mold part, and auxiliary power means for applying some of the force to the movable part in a direction parallel to the direction of extent of the guide pin, said auxiliary power means including a hydraulic motor connected with the movable mold part in alignment with the center of gravity thereof.

9. A molding machine including in combination a fixed frame, a mold including two parts, one of which is movable toward and from the other to close and open the mold, a linkage by which the movable mold part is connected with the frame, the linkage being operable to put the movable mold part in substantially closed position when the linkage reaches its limit of movement in one direction, and a fluid-operated motor in position to apply pressure to the mold to hold the mold closed after the linkage reaches its limit of movement whereby the final pressure for closing the mold is exerted after the linkage stops moving, characterized by the machine being a multi-mold machine with different molds located at different parts of the frame and with each mold having a part movable toward and from another part to open and close the mold, each mold having its own individual linkage and its own fluid-operated motor for applying the final pressure to hold the mold closed, a link-operating motor, and motion-transmitting means connecting the linkage for both molds to said link-operating motor by connections that open and close both molds from the same motor, and separate fluid-operated motors for applying final pressure to each mold.

10. The molding machine described in claim 9 characterized by the linkage for each mold including a toggle that moves into a substantially straight position by the time the movable mold part reaches substantially closed position and before the mold parts are brought together under mold-operating pressure, the motion-transmitting means including a common shaft that connects the toggles together for operating in unison.

11. The molding machine described in claim 1 characterized by the machine being a multi-mold machine with different molds located at different parts of the frame and with each mold having a part movable toward and from another part to open and close the mold, each mold having its own individual linkage and its own fluid-operated motor for applying the final pressure that holds the mold closed, the fluid-operated motors being connected with a common source of working fluid, means for supplying working fluid to the fluid-operated motors simultaneously, and a relief valve that limits the fluid-operated motors to a given maximum pressure.

12. The molding machine described in claim 1 characterized by the toggles each having its axes substantially parallel to those of the other toggle, one end of each toggle being pivotally connected with the frame adjacent to the corresponding end of the other toggle, and the other end of each toggle being connected with the movable mold part adjacent to the corresponding end of the other toggle, said toggles each having its links in alignment when the mold is substantially closed, and stops with which the toggles contact as their mid regions move beyond dead center and in directions approaching one another.

13. A molding machine including in combination a fixed frame, a mold including two parts, one of which is movable toward and from the other to close and open the mold, a linkage by which the movable mold part is connected with the frame, the linkage being operable to put the movable mold part in substantially closed position when the linkage reaches its limit of movement in one direction, and a fluid-operated motor in position to apply pressure to the mold to hold the mold closed after the linkage reaches its limit of movement whereby the final pressure for closing the mold is exerted after the linkage stops moving, characterized by the machine being a blow mold injection molding machine with an injection station and a blowing station, each of which has a mold including a part movable toward and from a second part to close and open the mold, a stripping station, a turret around which the different stations are located at angularly spaced positions, parison pins on the turret movable successively as the turret turns to the different molds at the injection and blowing stations and then to the stripping station, the mold at the injection station having said linkage operable to put the movable mold part in substantially closed position when the linkage reaches its limit of movement in one direction, and the mold at the blowing station having a linkage and fluid-operated motor similar to those at the injection station, a common linkage operating motor, and motion-transmitting means between the motor and both of the linkages for operating said linkages and their connected movable mold parts simultaneously and at the same speed whereby the mold at the different stations close and open in unison.

14. The molding machine described in claim 13 characterized by the frame of the machine having right and left hand portions in horizontal angular relation to one another, a base of the frame extending under both the right and left hand portions of the frame, the mold for one of the stations being between the base and the right hand portion of the frame, the mold for the other station being between the base and the left hand portion of the frame, said molds at the different stations being in angular relation to one another corresponding to the angular relation of the right and left hand portions of the frame with respect to one another, the linkages for the different molds being connected at their upper ends to the right and left hand portions respectively of the frame, a shaft extending across the frame from the right to the left hand portion thereof and connecting with the linkages for the different molds and constituting the motion-transmitting means from the linkage-operating motor, said linkages being connected with the molds by pivotal connections having axes extending obliquely across the molds and parallel to the axis of said shaft.

15. The molding machine described in claim 14 characterized by the linkage of each mold including a toggle pivotally connected at its upper end with one of the angularly related portions of the frame, the shaft constituting part of the pivotal connection and being secured to the upper link of the toggle for angular movement in unison therewith, the lower end of the toggle being connected with the movable mold part by a shaft extending through the lower link of the toggle and through lugs extending upward from the movable mold part.

16. The molding machine described in claim 15 characterized by a plurality of toggles connecting each movable mold part with the angularly related frame portions above the mold, parallel shafts that operate the different toggles for the different molds, and motion-transmitting connections that move all of the toggle-operating shafts in unison.

17. The molding machine described in claim 16 characterized by each of the toggles comprising a plurality of upper links on a common upper shaft that extends through bearings fixed to the angularly related portions of the frame, a plurality of lower links in alternating relation with the lower ends of the upper links on a pivot shaft at the mid point of the toggle, and a shaft extending through the lower ends of the lower links of the toggle and through bearings connected with the movable part of the mold.

18. A molding machine including in combination a fixed frame, a mold including two parts, one of which is movable toward and from the other to close and open the mold, a linkage by which the movable mold part is connected with the frame, the linkage being operable to put the movable mold part in substantially closed position when the linkage reaches its limit of movement in one direction, and a fluid-operated motor in position to apply pressure to the mold to hold the mold closed after the linkage reaches its limit of movement whereby the final pressure for closing the mold is exerted after the linkage stops moving, characterized by the movable portion of the mold including a top mold section which contains parts of a cavity of the mold, guide pins extending upward from a fixed portion of the frame for guiding the top mold section as it moves toward and from the other mold part, a secondary platen connected to the top mold section, other guide pins extending upward from the top mold section, a cylinder block overlying the secondary platen and movable toward and from the secondary platen, a lost motion connection between the secondary platen and the cylinder block which moves the secondary platen and top mold section upward with the cylinder block when the lost motion is taken up in an upward direction, a cylinder in the cylinder block, a piston in the cylinder with a portion of the piston extending through a bottom end wall into contact with the secondary platen, packing in the cylinder to prevent escape of hydraulic fluid therefrom, the cylinder-and-piston constituting said fluid-operated motor, the linkage that moves the movable mold part to open and close the mold being connected with the cylinder block and extending upward therefrom and having a travel sufficient to carry the movable mold part from a fully open mold position to a substantially closed position, the stroke of said piston being less than the lost motion between the secondary platen and the cylinder block.

19. The molding machine described in claim 18 characterized by the linkage being a toggle, the cylinder block containing a plurality of similar cylinders and pistons that apply pressure to the secondary platen at different locations to distribute the force that holds the mold closed, and the lost motion between the secondary platen and the cylinder block being a fraction of an inch.

20. A molding machine including in combination a fixed frame, a mold including two parts, one of which is movable toward and from the other to close and open the mold, a linkage by which the movable mold part is connected with the frame, the linkage being operable to put the movable mold part in substantially closed position when the linkage reaches its limit of movement in one direction, and a fluid-operated motor in position to apply pressure to the mold to hold the mold closed after the linkage reaches its limit of movement whereby the final pressure for closing the mold is exerted after the linkage stops moving, characterized by the frame of the machine having right and left hand portions in horizontal angular relation to one another, a base of the frame extending under both the right and left hand portions of the frame, the mold and its operating mechanism being between the base and the right hand portion of the frame, a similar mold and operating mechanism between the base and the left hand portion of the frame, the right and left hand portions of the frame being connected together at their rearward ends but diverging from one another as they extend forward and being spaced apart at their forward ends, a post supporting the forward end of the right hand portion from the base, another post supporting the forward end of the left hand portion of the base, and a rearward post supporting the rearward ends of the right and left hand portions from the base, the rearward post being of a cross section and tensile strength to withstand pressure of the molds from both the right and left hand portions of the frame.

21. The molding machine described in claim 20 characterized by the rearward post being of substantially greater cross section and tensile strength than that of each of the forward posts to compensate for the fact that it has to withstand pressure of the molds from both the right and left hand portions of the frame.

22. A molding machine including in combination a fixed frame having upper and lower frame structures, a mold including two parts, one of which is movable toward and from the other to open and close the mold, one part of the mold being fixed to the lower frame structure, mechanism for operating the movable part of the mold including motor means that react against the upper frame structure, the upper frame structure having right and left hand portions in horizontal angular relation to one another, the lower frame structure extending under both the right and left hand portions of the upper frame structure, the mold and its operating mechanism being between the lower frame structure and the right hand portion of the upper frame structure, a similar mold and operating mechanism between the lower frame structure and the left hand portion of the upper frame structure, the right and left hand portions of the upper frame structure being connected together at their rearward ends but diverging from one another as they extend forward and being spaced apart at their forward ends, a post supporting the forward end of said right hand portion from the lower frame structure, another post supporting the forward end of said left hand portion from the lower frame structure, and a rearward post supporting the rearward ends of the said right and left hand portions from the lower frame structure, the rearward post being of a cross section and tensile strength sufficient to withstand reaction pressure of the mold operating mechanism against both said right and left hand portions of the upper frame structure.

23. The molding machine described in claim 22 characterized by the upper frame structure having the right and left hand portions of one-piece construction, the posts supporting the right and left hand portions being located generally centrally across the width of said right and left hand portions, and the motor means which react against said right and left hand portions, when the mold is closed, being in substantial alignment with the center distances between the posts which support the respective right and left hand portions of the upper frame structure.

* * * * *